United States Patent [19]

Poloni

[11] Patent Number: 5,174,089
[45] Date of Patent: Dec. 29, 1992

[54] METHOD TO PACKAGE SECTIONS AND ROTARY PACKAGING MACHINE THAT EMPLOYS THE METHOD

[75] Inventor: Alfredo Poloni, Fogliano Di Redipuglia, Italy

[73] Assignee: Danieli & C. Officine Meccaniche SpA, Buttrio, Italy

[21] Appl. No.: 760,071

[22] Filed: Sep. 13, 1991

Related U.S. Application Data

[63] Continuation of Ser. No. 555,030, Jul. 20, 1990, Pat. No. 5,081,818, which is a continuation-in-part of Ser. No. 540,268, Jun. 19, 1990, abandoned.

[30] Foreign Application Priority Data

Aug. 7, 1989 [IT] Italy ................. 83465 A/89

[51] Int. Cl.⁵ ............. B65B 35/50; B65B 35/56
[52] U.S. Cl. .................. 53/446; 53/447; 53/540; 53/544; 53/149; 414/788.3; 414/791.4
[58] Field of Search ................. 53/143, 149, 150, 446, 53/447, 540, 544; 414/762, 765, 766, 771, 788.3, 791.4, 794, 794.2

[56] References Cited

U.S. PATENT DOCUMENTS 3,347,397 10/1967 Hein ................. 414/791.4
4,278,377 7/1981 Elineau ............. 414/791.4 X
4,487,540 12/1984 Buchheit ........... 414/791.4 X

FOREIGN PATENT DOCUMENTS 156135 12/1980 Japan ................. 414/791.4
2092091 8/1982 United Kingdom ..... 414/791.4

Primary Examiner—John Sipos
Assistant Examiner—Linda B. Johnson
Attorney, Agent, or Firm—Antonelli, Terry, Stout & Kraus

[57] ABSTRACT

Method to package sections either in normal layers or in alternate right-side-up/overturned layers, the layers being fed from determined layers, whereby two already butted layers, one having a number N of sections and the other having a number N−1 of sections, or vice-versa, reach the packaging machine by moving axially at one end the same time, the layers having been distanced apart laterally beforehand by a required value linked to the features of the packaging machine, the first layer (30) of "N" sections arriving and being positioned directly on a package (29) being formed, whereas the second layer (31) of "N−1" sections arrives between a plurality of pairs of clamping arms (24) able to rotate about an axis located in a central position between the two layers (30-31), the pairs of clamping arms (24) positioning the second layer (31) on the package (29) being formed.

Rotary packaging machine able to package sections either in normal layers or in alternate right-side-up/overturned layers according to the above method, the packaging machine being fed by determined layers of the sections and comprising a plurality of pairs of clamping arms (24) able to rotate about an axis which is located along the length of the packaging machine and which is parallel to the package (29) being formed, the clamping arms (24) lying on a plane passing through and radial to that axis, the axis of rotation lying between the two planes of axial arrival of the sections, the arms (24) being secured to rotary means (21).

7 Claims, 5 Drawing Sheets

METHOD TO PACKAGE SECTIONS AND ROTARY PACKAGING MACHINE THAT EMPLOYS THE METHOD

This application is a continuation of prior application Ser. No. 07/555,030 filed Jul. 20, 1990, now U.S. Pat. No. 5,081,818 which is a continuation-in-part of prior application Ser. No. 07/540,268 filed Jun. 19, 1990, now abandoned.

This invention concerns a method to package sections and also a rotary packaging machine that employs the method. To be more exact, the method concerns a packaging machine that comprises layer overturning means including arms able to rotate about an axis.

The state of the art includes machined to package sections which may be rolled, formed, extruded, etc.

Such packaging machines arrange the packages with alternate layers of sections, one layer of the alternate layers being normally overturned to bond the package together.

The known packaging machines entail a plurality of drawbacks. A first drawback is the fact that the machines cannot be installed directly in line downstream of the shears, which in turn is located downstream of the straightening machine.

A second drawback is that the machines cannot package alternate right-side-up and overturned layers either travelling or halted.

A third drawback is that the machines can process only very closely determined ranges of sections and cannot always handle angle irons just as well as smooth and/or ribbed round bars.

A fourth drawback is that the fastening of the package is not carried out in line.

Moreover, the known systems entail considerable overall sizes, cover large areas, require heavy maintenance costs in view of the complexity of the mechanisms, cannot adapt themselves to the various sections and involve long times for their cycle, great running costs and considerable installed power.

The present invention overcomes all the drawbacks of the state of the art and achieves a plurality of advantages.

The invention under examination provides packaging machines which can package in line immediately downstream of the shears.

Furthermore, a packaging machine according to the invention offers:

smaller overall sizes and reduced areas and volumes occupied;

much lower running and maintenance costs, the installed power required being much less for the same output;

the ability to adapt itself independently to the various sections and to process smooth and ribbed round bars too;

much shorter times of its cycle as the various steps take place in sequence.

The packaging method and the rotary packaging machine according to the invention are set forth and characterized in the main claims, whereas the dependent claims describe variants of the idea of the original solution.

According to the invention the rotary packaging machine of the invention is installed in a production line.

According to the invention, if alternate right-side-up and overturned layers are to be packaged, the sections reach the packaging machine in the form of a double layer. The two layers arrive already formed and combined and consist of a right-side-up layer of "N" sections and a layer to be overturned consisting of "N−1" sections.

The two layers reach the packaging machine side by side and butted but are suitably distanced sideways.

The pre-arrangement of the layers may take place downstream of the cooling plate and the butting may be carried out in any known way, even by a suitable shears downstream of the multiple straightening machine.

On of the two layers is already positioned vertically in relation to the package being formed when it reaches the packaging machine, whereas the other layer, which has to be overturned, arrives alongside the first layer and is engaged by a plurality of rotary arms which cooperate with the package being formed.

According to a first embodiment the arms are secured, substantially on a diametrical plane, to their own circular rotary ring, a plurality of such circular rotary rings being comprised and containing the two layers and the package being formed.

According to a variant of this idea of the embodiment the arms are located on a plane passing through the centre of rotation and are secured to a rotary shaft that supports and positions the whole plurality of such arms.

The arms which support and convey the sections are included in pairs and are oriented towards the centre of rotation in an engagement and delivery position.

Furthermore, the arms are positioned substantially horizontally and at least one arm in each pair can move; both the arms can be withdrawn advantageously, that is to say, they are enabled to be withdrawn from contact with the package or layer.

The arms can be included on one side alone or on both sides of the ring or shaft and can be located substantially on a diametrical plane. In such a case, pairs of arms may be included on both sides of the ring or shaft, or else pairs may be included on one side, while single arms are included on the other side.

The arms normally serve to engage, overturn and place the overturned layer on the package being formed.

The package being formed is supported on vertically movable arms suitable to move the package itself step by step vertically as required and to deliver it, when formed, to lower removal means.

The layer positioned right-side-up is placed on the package, for instance, by a thrust applied by the straightening machine or by a drawing means located downstream of the shears which shears to size.

According to a variant the right-side-up layer is positioned by the action of retractable rollers located between the package and the plane of arrival of the layer. According to another variant the right-side-up layer is positioned by the action of overlying caterpillar-type rollers or belts acting by pressure or magnetically on the upper layer.

According to a further variant the right-side-up layer is engaged by auxiliary withdrawable arms able to move lengthwise to the package being formed and suitable to position the right-side-up layer on the package.

As we said above, the arms may also be of a twin and counterpart type lying on a diametrical plane and may therefore work alternately to overturn a layer.

According to a variant the arms perform also the tasks of auxiliary withdrawable arms and, besides being vertically movable (at least one of them) and being capable of being withdrawn, can also move lengthwise to the package. In this way the arms which have overturned the layer to be overturned are those which engage the right-side-up layer and place it on the package being formed.

The arms can be withdrawn axially (backwards and forwards) or laterally (on a support) and may include magnetic means to engage and anchor the sections.

Moreover, at least one arm per pair can move vertically on a plane at a right angle to the lengthwise axis of the package being formed.

In view of the dimensions involved the invention can be easily soundproofed and protected.

The attached figures, which are given as a non-restrictive example, show the following:

FIG. 1 shows a simplified diagram of the invention installed in a rolling line;

FIGS. 2a and b show two working conditions;

Figure 1:
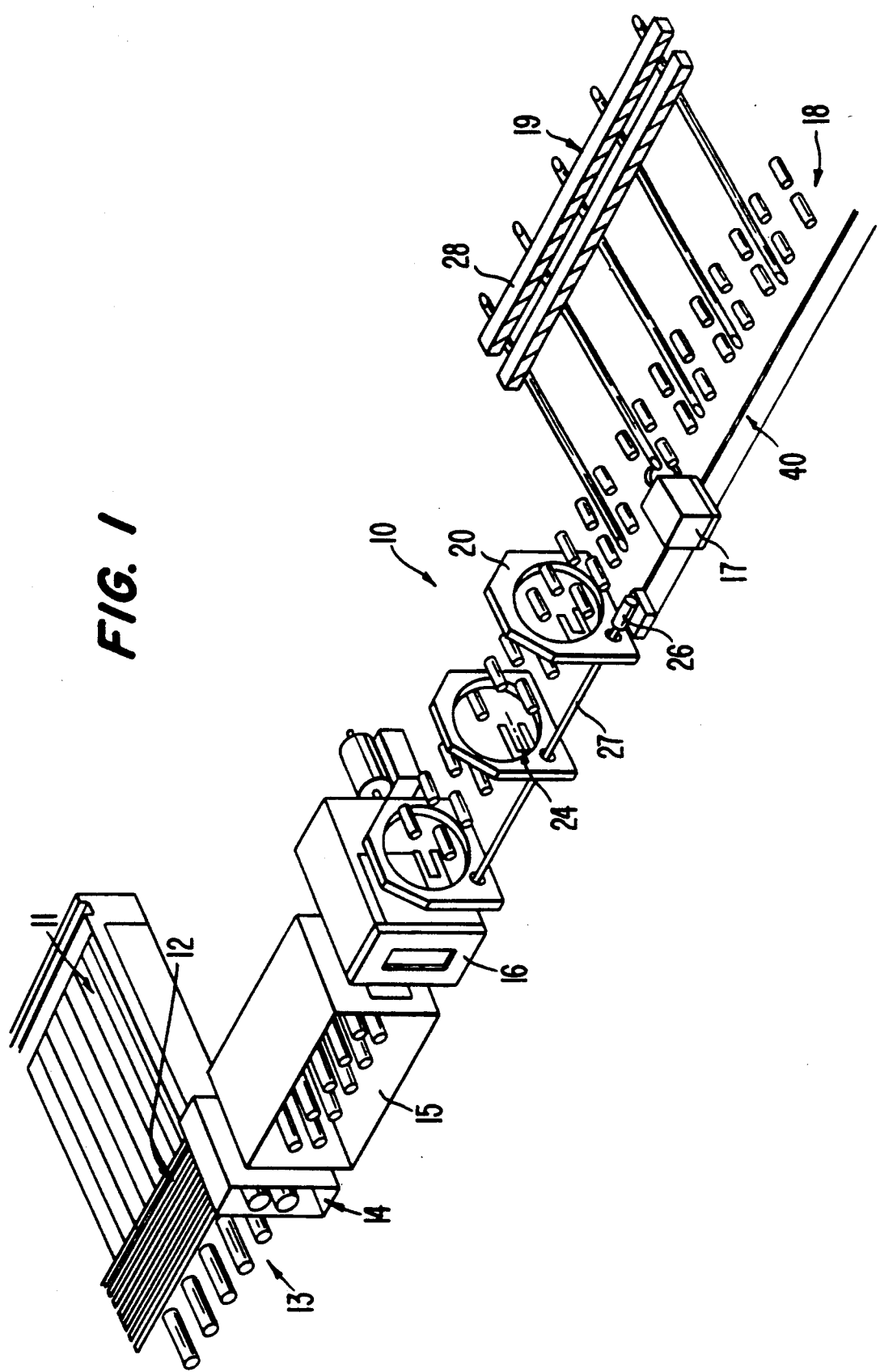

A rotary packaging machine 10 according to the invention, as shown in FIGS. 1 to 6, can be installed readily in the finishing zone of a rolling plant to make rational the processing cycle and the lay-out. FIG. 1 shows a posssible rationalized lay-out.

A rolled item arrives on a plate 11 which includes an area 12 for the formation of layers of sections.

The layer or layers are traversed from the area 12 onto a feeder conveyor 13.

The invention makes possible the processing of sections which have to be packaged in alternate right-side-up and overturned layers and also of sections which are to be packaged without anchorage between the layers.

Thus, in relation to the characteristics of the section and of the package, the area 12 may contain:
only one layer,
or two equal layers positioned parallel and side by side but suitably distanced laterally,
or two parallel layers side by side but distanced laterally, of which one layer will remain as already oriented while the other layer has to be overturned.

The feeder conveyor 13 delivers the layer or layers side by side to a drawing means 14, which feeds the layers to a multiple straightening machine 15.

The layer or layers side by side pass from the multiple straightening machine 15 to a shears 16, which may be of any type and shears the layers to size.

Hereinafter we shall describe the case of layers side by side 30-31, of which one layer 31 has to be overturned so as to bond itself to the previous layer 30 and successive layer 30.

According to the situation of FIGS. 1 to 4 a formed package 28 leaving a rotary packaging machine 10 is moved axially on a package-removal roller conveyor 18 and passes on to a binding zone 40 which holds one or more binding machines. In the example of FIG. 1 there is one wheeled binding machine 17.

The bound packages 28 pass from the binding zone 40 to a weighing machine and thence to a store 19 for bound packages.

Figure 5:
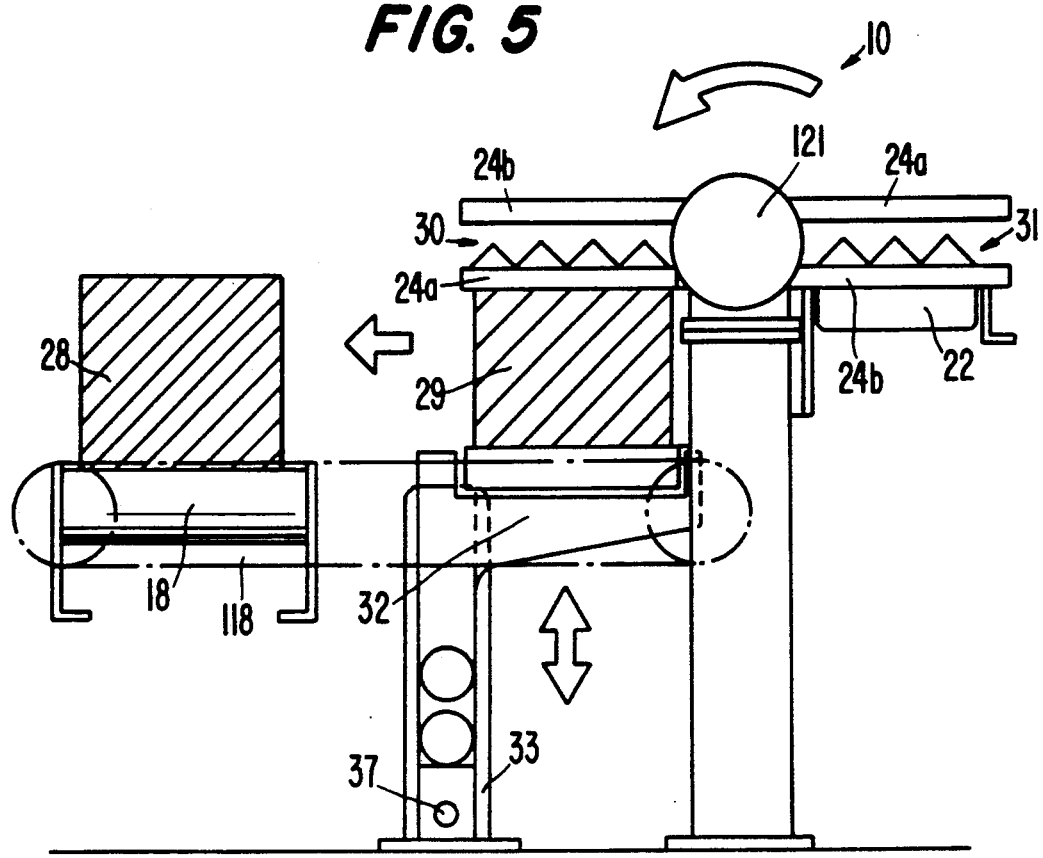
FIG. 5 shows a variant with a central support shaft.

In the example of FIG. 5 the formed package 28 can be fed onwards as shown in FIG. 1 but, if so required, can also be traversed sideways and the binding machine can be positioned laterally, thus achieving a further greater use of the space available.

The two layers, namely 30 consisting of "N" sections and remaining right-side-up and that 31 consisting in this case of "N−1" sections to be overturned so as to be bonded better to the layer 30 deposited previously and to the layer 30 to be deposited successively, reach the rotary packaging machine 10 at the same time and are side by side and distanced laterally according to requirements.

The sheared layer 31 to be overturned is clamped by arms 24a and 24b, is actuated by devices 25a and 25b and is rotated by 180° as so to be above the right-side-up layer 30.

The overturned layer 31 is then rested on the right-side-up layer 30 and is freed of the supporting action of the clamping arms 24, since the arms 24a and 24b become reciprocally distanced vertically owing to the action of the actuator devices 25b and are rotated on their pivot 39 in a coordinated and progressive manner by the actuator 25a.

The first layers 30-31 forming the first two layers of a package 29 being formed arrive respectively on a supporting conveyor consisting of support arms 32, which may include idler support rollers, and on a roller conveyor 22.

The successive layers 30-31 arrive respectively above the package 29 being formed and the clamping arms 24.

When the clamping arms 24 have delivered the overturned layer 31 to the package 29 being formed, they return along their path or remain halted to allow another pair of clamping arms to overturn the next layer or continue their travel to their starting position and are pre-arranged for another layer 31 to be overturned which is about to arrive or has already arrived.

The clamping arms, when they have discharged a layer, are re-positioned radially in a readied position and clamp the layer 31 for a new cycle.

Lower or upper rollers, magnetized or not, or axially movable shafts may be included instead of the upper clamping arms 24a.

The upper clamping arms 24a may be disactuated momentarily and the lower clamping arms 24b alone may be caused to function.

The clamping arms 24 may comprise magnetic and-/or prepositioner means of a known type.

The layer 31 arrives on the roller conveyor 22 alongside the right-side-up layer 30 and substantially at the same time as the latter 30 and is positioned between the upper and lower clamping arms 24a-24b (see FIGS. 2a and 5), or else the clamping arms 24 are positioned in relation to the layer 31.

As we said above, the clamping arms 24 can move vertically along their pivot 39 owing to the action of the actuator 25b and therefore can clamp the layer 31 to be overturned.

Figure 6:
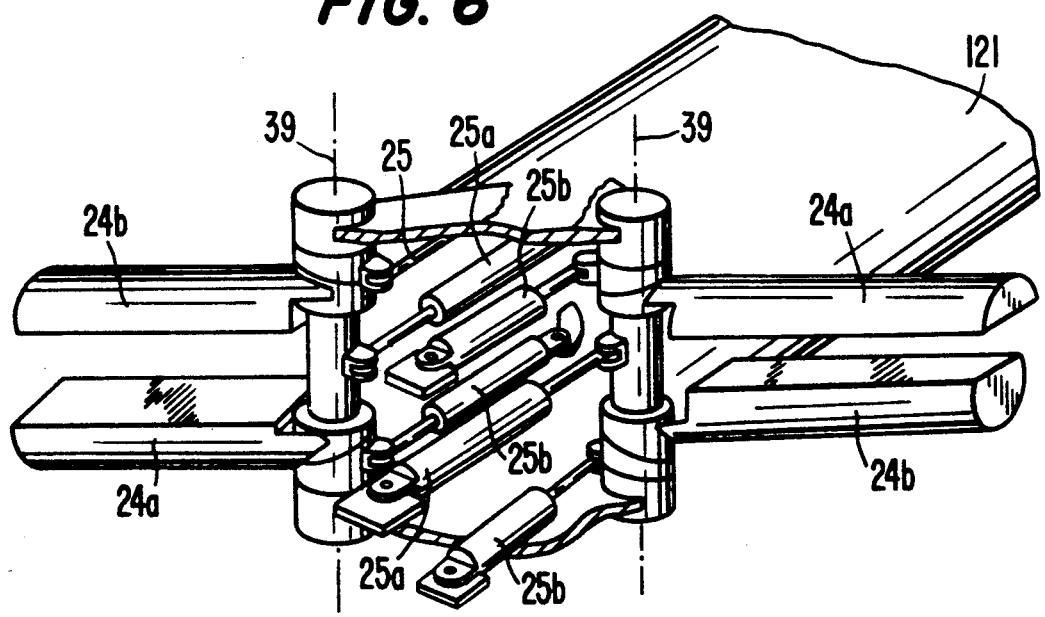
FIG. 6 shows a possible actuation system for the arms of FIG. 5.

The actuators 25b can act in a linear or other manner, for instance on a circular cam (FIG. 6).

When the layer 31 to be overturned has been clamped by the upper clamping arms 24a, the upper and lower arms 24 are rotated by 180° so that they can place the layer 31 overturned on the previous right-side-up layer 30 located on the package 29 being formed.

In the example of FIG. 1 the clamping arms 24 are borne and positioned on a circular sector 21 lodged in a housing 20; the circular sector 21 is rotated by a motive wheel 23 driven by a shaft 27 set in rotation by a motor 26 (FIG. 1).

Figure 2A:
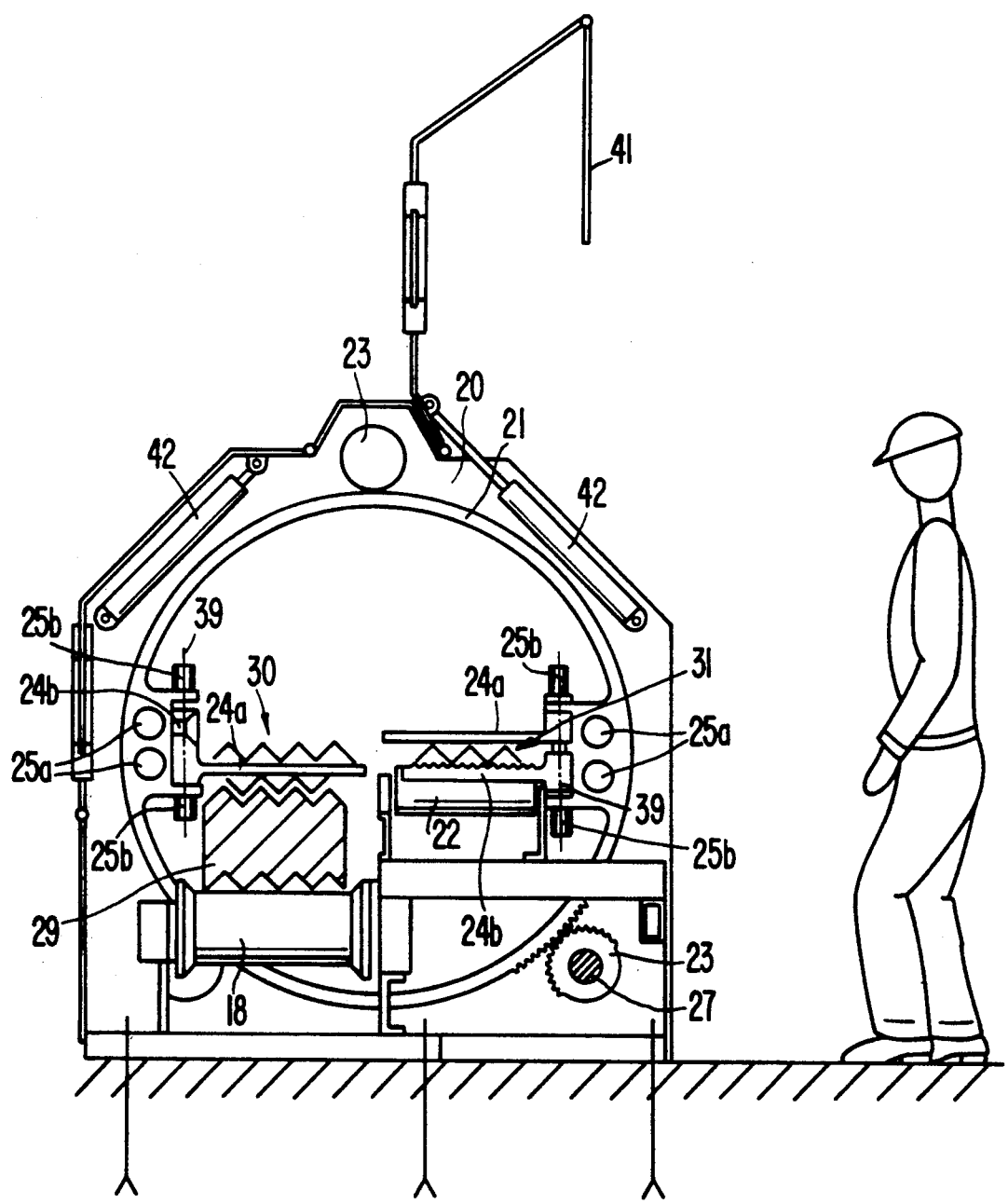
Figure 2B:
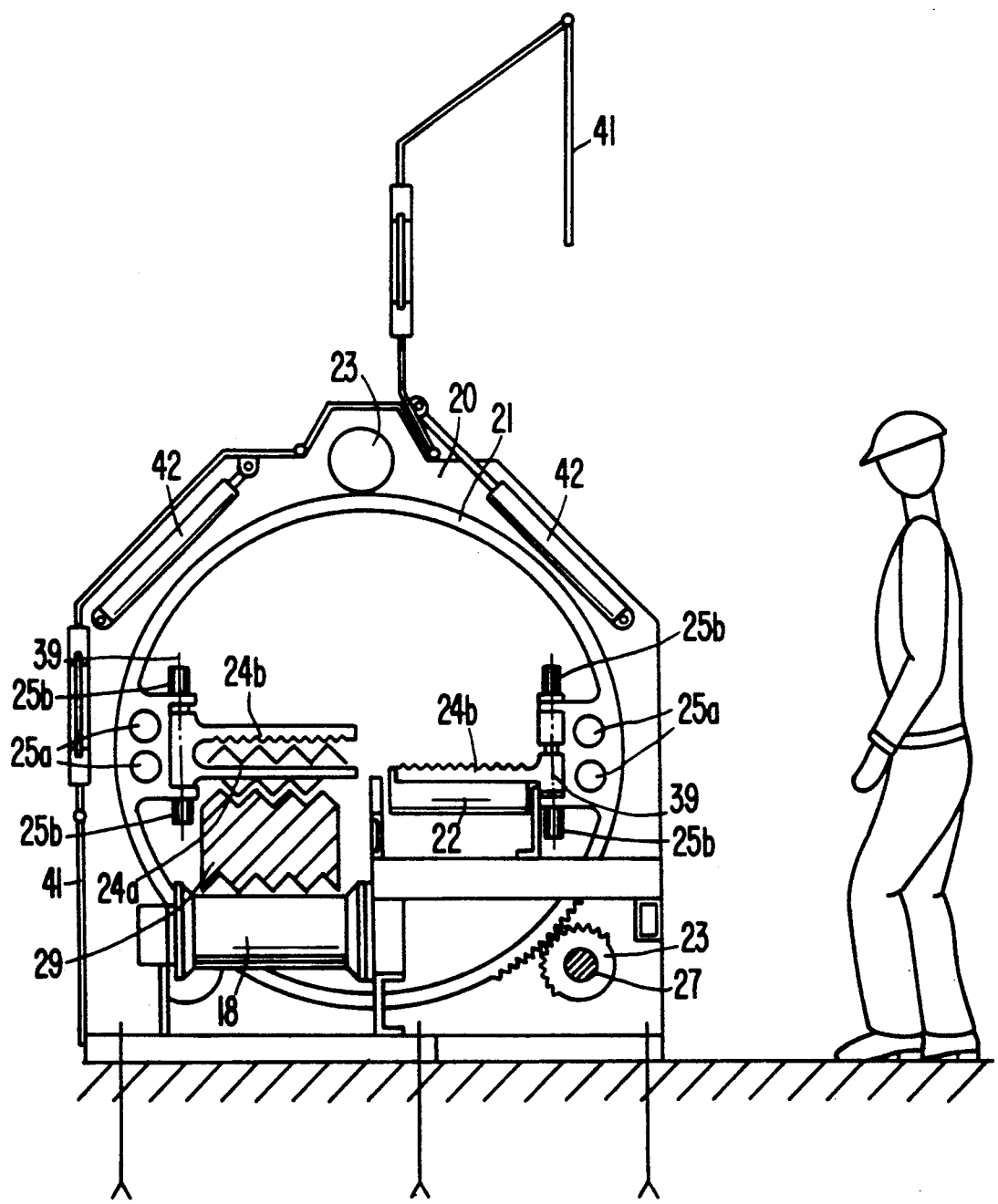

In the example shown in FIGS. 2 and 5 the overturned layer 31 is deposited by lateral withdrawal of the clamping arms 24 rotated about their pivot 39.

When the overturned layer 31 has been deposited, the clamping arms 24 return to their inward position as soon as the support arm 32 has lowered by a correct value the package 29 being formed.

When the clamping arms 24 have returned to their inward position and the clamping arms 24 of the next layer 31 to be overturned are in position (FIGS. 2a and 5), the next pair of layers 30-31 are fed and the cycle is repeated.

Figure 3:
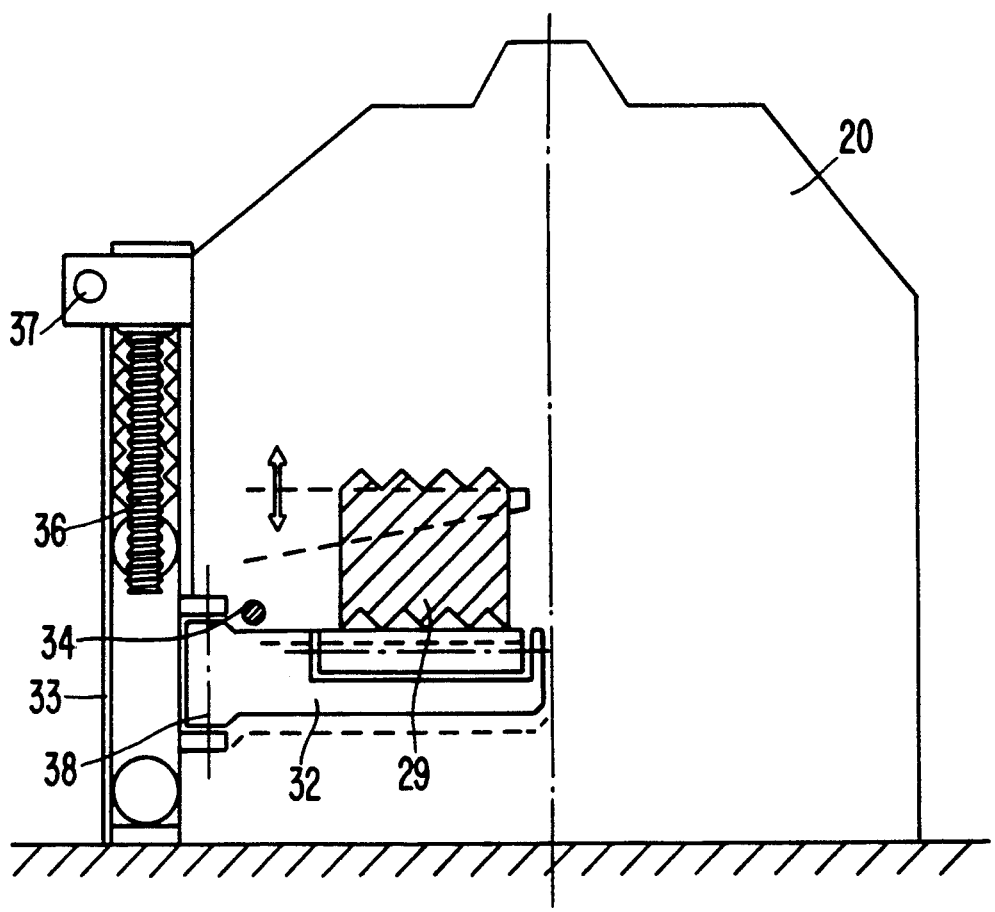
FIG. 3 shows the behavior of possible arms to bear packages.
Figure 4:
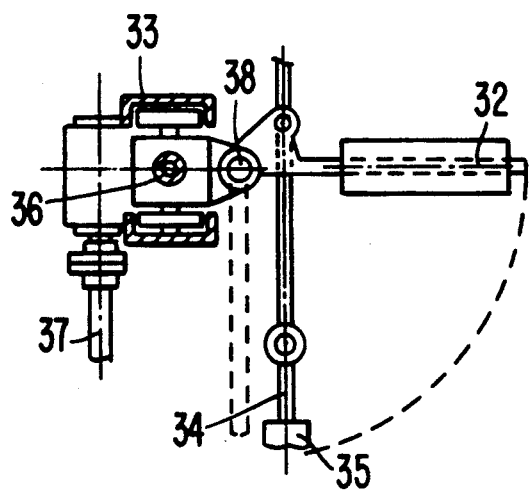
FIG. 4 shows the actuation of the arms of FIG. 3.

In this case the support arms 32 are upheld on a guide column 33, and can move, supported at one end on a vertical pivot 38 in the example of FIG. 3.

Lateral positioning of the support arms 32 is carried out by means of an actuation bar 34 driven by an actuation motor 35.

Vertical positioning of the support arms 32 is determined by vertical movement assemblies 36 connected together by an assembly actuation rod 37.

In the example of FIGS. 2, when the package 29 is completed, the support arms 32 place it on the package removal conveyor 18, are withdrawn laterally, ascend and are re-positioned while the formed package 28 is removed axially.

In the example of FIG. 5 the formed package 28 is removed laterally by conveyors 118, which thereafter deliver the package 28, bound or not, to the removal roller conveyor 18.

The packaging machine according to the invention can be readily soundproofed with a movable screen 41, which besides performing safety functions carries out the tasks of muffling and containing noises, the cycle being controlled through appropriate windows.

When work on the machine is necessary, the screen 41 is lifted by a jack 42 so as not to create obstacles.

In the situation of FIG. 2 and also in that of FIGS. 5 and 6 it can be seen that the pairs of clamping arms 24, being one or more pairs per each housing, lie on a diametrical plane and have a very simple structure.

In FIGS. 1 and 2 the clamping arms 24 are secured to the circular sector 21, whereas in FIGS. 5 and 6 they are secured to a central shaft 121. The embodiment of FIGS. 5 and 6 leaves the sides free of any constraint.

Both the embodiments enable the two layers 30-31 to arrive together astride the lengthwise axis of rotation of the clamping arms 24, to arrive axially, to arrive on the same plane and to arrive already pre-positioned.

Both the embodiments enable the packaging machine to be kept in line with the straightening machine, at the same time simplifying the lay-out and reducing the overall size. Moreover, the whole structure of the packaging machine is greatly reduced.

I claim:

1. A rotary packaging machine for packaging sections, comprising:
    a shaft able to rotate about its longitudinal axis, the longitudinal axis of the shaft being substantially parallel to or coaxial with a longitudinal axis of said rotary packaging machine;
    means for rotating said shaft about its longitudinal axis;
    means delivering said sections along the longitudinal axis of the rotary packaging machine to a position adjacent said shaft in first and second layers, each of said first and second layers comprising a plurality of butted sections, said first and second layers being spaced laterally by a predetermined distance and being positioned on opposing sides of said shaft;
    package support means for supporting a package being formed and having a position below a delivery position at which said first layer of sections is delivered;
    two pairs of clamping arms secured to said shaft, one pair being secured at a position diametrically opposed to a position at which the other pair is secured, each pair of claiming arms having a working position extending in a direction substantially normal to the longitudinal axis of said shaft such that said second layer of sections can be clamped between one pair of clamping arms and be rotated with said shaft about the longitudinal axis of said shaft so as to overturn second layer of sections over said first layer of sections, and said clamping arms having a retracted position extending in direction substantially parallel to the longitudinal axis of said shaft for depositing said second layer of sections on said package.

2. A method for packaging sections, comprising:
    delivering said sections in first and second separated layers to first and second delivery positions on diametrically opposed sides of a supporting shaft, respectively, said first and second layers laying on a substantially horizontal plane and being spaced from each other laterally by a predetermined distance, said first layer comprising N number of butted sections and said second layer comprising N±1 number of butted sections;
    depositing said first layer of sections on a package being formed under said first delivery position;
    clamping said second layer of sections between a first pair of clamping arms, said first pair of clamping arms being mounted to said shaft to which a second pair of clamping arms is secured at a position diametrically opposed to a position at which said first pair is secured, said clamping arms having a working position extending in a direction substantially normal to the longitudinal axis of said shaft for clamping the layers of sections and a retracted position extending in a direction substantially parallel to the longitudinal axis of said shaft for depositing said layers of sections, said shaft being rotatable about its longitudinally extending axis which lies between said first and second delivery positions;
    rotating said shaft, said clamping arms and said second layers of sections clamped between said pair of clamping arms to thereby overturn said second layer of sections and position said second layer of sections over said first layer of sections and to move said second pair of clamping arms to said second delivery position for receiving another layer of sections;
    retracting at least a lower one of said pair of clamping arms thereby depositing the overturned second layer of sections on said first layer of sections.

3. Rotary packaging machine according to claim 1, wherein at least one clamping arm of each of said two pairs of clamping arms can move in relation to the other clamping arm of each of said two pairs of clamping arms.

4. A rotary packaging machine according to claim 1, wherein each of said two pairs of clamping arms is movable from a first layer-engagement position to a second position for delivery of an overturned layer, the first layer-engagement position and the second position being about 180° to each other about the circumference of said shaft.

5. A rotary packaging machine according to claim 4, wherein the first layer-engagement position of each of said two pairs of clamping arms cooperates with a roller conveyor conveying the second layer of sections to be overturned.

6. A rotary packaging machine according to claim 1, wherein the second position for delivery of an overturned layer is directly over the package being formed.

7. A rotary packaging machine according to claim 6, wherein the package support means is vertically movable.

* * * * *